(12) United States Patent
El Khiyaoui et al.

(10) Patent No.: US 12,438,718 B2
(45) Date of Patent: Oct. 7, 2025

(54) STORING DATA IN A TREE USING BILINEAR ACCUMULATION

(71) Applicant: International Business Machines Corporation, Armonk, NY (US)

(72) Inventors: Kaoutar El Khiyaoui, Zurich (CH); Angelo De Caro, Zürich (CH); Elli Androulaki, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 18/191,029

(22) Filed: Mar. 28, 2023

(65) Prior Publication Data

US 2024/0171394 A1 May 23, 2024

(30) Foreign Application Priority Data

Nov. 17, 2022 (GR) ........................ 2410-0004610359

(51) Int. Cl.
*H04L 9/30* (2006.01)
*H04L 9/32* (2006.01)

(52) U.S. Cl.
CPC .............. *H04L 9/30* (2013.01); *H04L 9/3236* (2013.01)

(58) Field of Classification Search
CPC ........ H04L 9/30; H04L 9/3236; H04L 9/3265; H04L 9/50
See application file for complete search history.

(56) References Cited

U.S. PATENT DOCUMENTS

| | | | |
|---|---|---|---|
| 2011/0225429 A1* | 9/2011 | Papamanthou | G06F 16/2246 713/189 |
| 2017/0033933 A1* | 2/2017 | Haber | G06F 16/93 |
| 2020/0126075 A1 | 4/2020 | Fisch | |
| 2021/0142908 A1* | 5/2021 | Lahrmann | G06N 3/042 |
| 2021/0336789 A1* | 10/2021 | Chalkias | H04L 9/3239 |
| 2023/0254136 A1* | 8/2023 | Stewart | H04L 9/50 713/150 |

OTHER PUBLICATIONS

Erwig et al., "COMMITEE: An Efficient and Secure Commit-Chain Protocol using TEEs," https://eprint.iacr.org/2020/1486, Nov. 26, 2020, 22 pgs.
Khalil et al., "Commit-Chains: Secure, Scalable Off-Chain Payments," https://eprint.iacr.org/2018/642/20191023:182917, Jun. 30, 2018, 22 pgs.
Narula et al., "zkLedger: Privacy-Preserving Auditing for Distributed Ledgers," https://eprint.iacr.org/2018/241, Mar. 2, 2018, 16 pgs.
Wust et al., "Platypus: A Central Bank Digital Currency with Unlinkable Transactions and Privacy Preserving Regulation," https://eprint.iacr.org/2021/1443, Oct. 27, 2021, 18 pages.

* cited by examiner

*Primary Examiner* — Eric W Shepperd
(74) *Attorney, Agent, or Firm* — Scott Dobson

(57) ABSTRACT

The present disclosure relates to storing a set of n data entries. The method includes creating a tree of ary l such that n leaf nodes of the tree comprise a set of hash values of the set of data entries respectively. For each parent node of the tree, a bilinear accumulator of hash values of l children of the parent node may be computed. A hash value of the bilinear accumulator may be computed. The root node of the tree may be stored as a representation of the content of the set of data entries.

17 Claims, 4 Drawing Sheets

STORING DATA IN A TREE USING BILINEAR ACCUMULATION

BACKGROUND

The present disclosure relates to the field of digital computer systems, and more specifically, to a method for storing data in a tree using bilinear accumulation.

Collecting and storing data is a known concept. In particular, data has been stored in various ways using, for example, databases. However, there is a continuous need to provide efficient and secure storage of data.

SUMMARY

According to embodiments of the present disclosure, a method for storing a set of n data entries is provided. The method comprises: creating a tree of ary l such that a number n of leaf nodes of the tree comprise a set of hash values of the set of data entries respectively; for each parent node of the tree, computing a bilinear accumulator of hash values of l children of the parent node, and computing a hash value of the bilinear accumulator; storing the root node of the tree as a representation of the content of the set of data entries.

Further embodiments include a computer program product and system for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
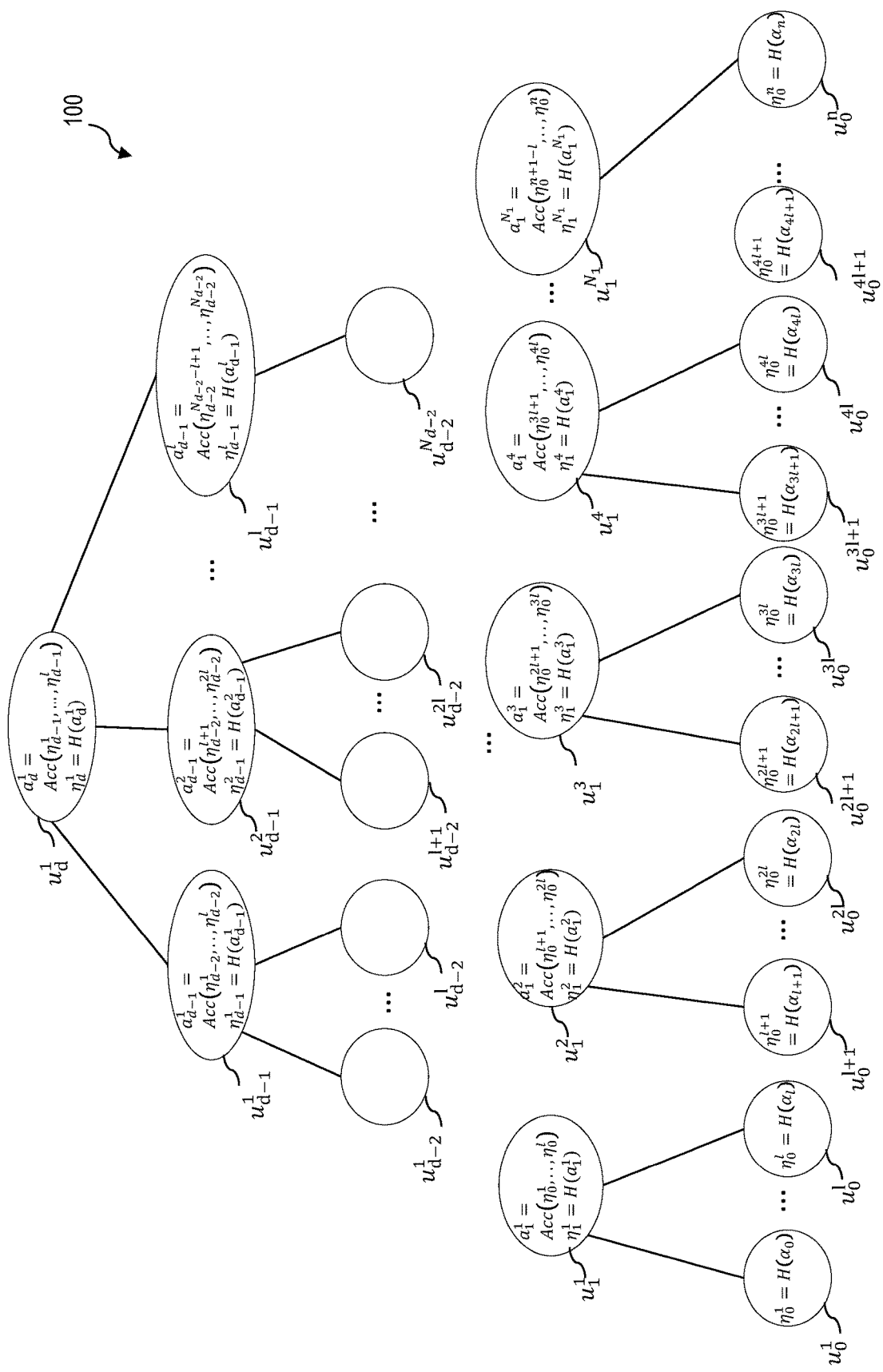
FIG. 1 depicts a tree in accordance with an example embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Secure storage of data entries may be a challenging task in particular for large amounts of data entries. A data entry may represent an entity. The entity has a distinct and separate existence. The entity has certain attributes or features, which may be assigned values. For example, a person is an entity. The attributes for a person's entity may be a name, bank identifier (ID), transaction ID, person's account balance etc. For example, the data entry may comprise attribute values describing a transaction performed by a user. The data entry may thus comprise values of one or more attributes of the entity, wherein the attributes are descriptive of the entity. The present subject matter may enable a secure and efficient storage of the data entries by using a tree. The storage may be secure because of the restricted access to the content of the tree. The present subject matter may, for example, enable storing data in a tree using bilinear accumulation for privacy-preserving proofs of inclusion and applications to a central-bank digital currency database.

The tree may be a data structure whose elements are linked in a hierarchical fashion. The tree may represent a hierarchical tree structure with a set of connected nodes. The tree may be an l-ary tree. Each node in the tree, which is not the root node and not a leaf node, may be connected to l children and connected to exactly one parent node. The root node has no parent node and is connected to l children. The leaf node has no children and is connected to one parent node. A node which is not a leaf node may be referred to as non-leaf node. The tree may, for example, be a complete tree. The tree may have a maximum height d, that is, the root node may have the height d, the children of the root node may have the height d−1 and so on. The height of the tree may, for example, be referred to or indexed with index h having values between 0 and d, $0 \leq h \leq d$ e.g., a node u with lower index h, noted as $u_h$, indicates that the node u has the height h in the tree. The node u may also be indexed with upper index $r_h$ as follows $u_h^{r_h}$ to indicate that the node u is the $r_h^{th}$ node of the tree having the height h of the tree. The index $r_h$ may vary between one and the total number $N_h$ of nodes having the same height h. Thus, following this notation scheme, the most left leaf node of the tree may be referred to as $u_0^1$ and the root node may be referred to as $u_d^1$, $N_d=1$, $N_{d-1}=l$ etc.

The present subject matter may combine cryptographic hashing with an accumulator scheme in order to store data entries in a tree. The cryptographic hashing may be performed into integers of a finite field $\mathbb{F}_q$ over prime q. The accumulator scheme may be an algorithm to combine a set of values into one, referred to as accumulator, such that there is a witness that proves that a given value was indeed incorporated into the accumulator. The accumulator may be a bilinear pairing-based accumulator, referred to as bilinear accumulator. For example, to compute the bilinear accumulator, a prime order group generator may be exponentiated to the product of monomials (x+ζ) where x are the accumulated elements and ζ is a secret key. And the membership proof for an element y may be the remaining product in the exponent after removing the term (y+ζ). The generator may be a generator of a bilinear group. The bilinear group may consist of three groups $\mathbb{G}_1$, $\mathbb{G}_2$ and $\mathbb{G}_t$ and a bilinear mapping e. The bilinear group may be seamlessly integrated with the previously defined cryptographic hashing by providing $\mathbb{G}_1$ and $\mathbb{G}_2$ as cyclic groups of the same prime order q as the finite field $\mathbb{F}_q$ (of the cryptographic hashing) and $\mathbb{G}_t$ as a cyclic group of the same prime order q as the finite field $\mathbb{F}_q$. In addition, the cyclic group $\mathbb{F}_q^*$ associated with the finite filed $\mathbb{F}_q$ may be used to define the bilinearity property for the bilinear group. The cyclic group $\mathbb{F}_q^*$ may be a group of nonzero elements of finite field $\mathbb{F}_q$. The bilinear group may thus enable a pairing-based cryptography. The pairing-based cryptography may be performed by pairing between elements of the two groups $\mathbb{G}_1$ and $\mathbb{G}_2$ to the third group $\mathbb{G}_t$ with the mapping or pairing $e: \mathbb{G}_1 \times \mathbb{G}_2 \to \mathbb{G}_t$ to construct a value. The mapping e may be an efficient mapping. In the following, the same group is used for the first two groups, that is $\mathbb{G}_1 = \mathbb{G}_2 = \mathbb{G}$, but it is not limited to. In this case, the bilinear accumulator may require two cyclic groups $\mathbb{G}$ and $\mathbb{G}_t$ that admit an efficient bilinear pairing $e: \mathbb{G} \times \mathbb{G} \to \mathbb{G}_t$ and g a random generator of the cyclic group $\mathbb{G}$. The pairing may be symmetric and is a mapping from two elements of one group to an element from a second group. The bilinearity property may be defined as follows: $\forall a, b \in \mathbb{F}_q^*, \forall g \in \mathbb{G}$, $e(g^a, g^b) = e(g^a, g)^b = e(g, g^b)^a = e(g, g)^{ab}$. Hence, the present subject matter may provide an optimal combination of cryptographic hashing with pairing-based cryptography in order to provide a secure storage of data entries using a hash tree.

A set of n data entries $\{\alpha_1, \alpha_2, \ldots, \alpha_n\}$ may be provided. For example, a computer system may receive the set of n data entries $\{\alpha_1, \alpha_2, \ldots, \alpha_n\}$ from one or more users. For example, the set of n data entries $\{\alpha_1, \alpha_2, \ldots, \alpha_n\}$ may be collected or acquired during a predefined time period which may be referred to as epoch. For example, the computer system may be configured to receive a set of data entries at the end of each epoch, wherein the set of n data entries $\{\alpha_1, \alpha_2, \ldots, \alpha_n\}$ is received at the end of its respective epoch. In order to store the set of n data entries $\{\alpha_1, \alpha_2, \ldots, \alpha_n\}$, a tree may be created. For example, the tree may be built or created by a computer system of a data manager which may be referred to as intermediary. The tree may be created with a number n of leaf nodes, $u_0^1, \ldots, u_0^n$ which is equal to the number of data entries to be stored. That is, the total number of leaf nodes $N_0$ is equal to the number of data entries, $N_0 = n$. The number of data entries n may be a multiple of the ary l such that n % l=0 (% being a modulo operation). For example, $n = l^d$, where d is the maximum height of the tree. Each leaf node is associated with a respective entry of the set of data entries. Each leaf node of the leaf nodes may have a hash value of the respective data entry. The hash value may, for example, be obtained by a cryptographic hash function H. The cryptographic hash function may be defined as follows: $H: \{0,1\}^* \to \mathbb{F}_q$, where $\mathbb{F}_q$ is the finite field over prime q. The hash function may enable to hash from $\{0,1\}^*$ into the integers in $\mathbb{F}_q$. For example, the node $u_0^1$ may have a hash value $\eta_0^1 = H(\alpha_1)$ of the data entry $\alpha_1$, the node $u_0^2$ may have a hash value $\eta_0^2 = H(\alpha_2)$ of the data entry $\alpha_2$, the node $u_0^n$ may have a hash value $\eta_0^n = H(\alpha_n)$ of the data entry $\alpha_n$ etc. A cryptographic hash function may be a mathematical algorithm that maps data of an arbitrary size to a bit array of a fixed size, the "hash value" or "hash". The cryptographic hash function may be deterministic, meaning that the same message always results in the same hash. The hash function may be advantageous because it hides the mapped data e.g., and the only way to find a message that produces a given hash may be to attempt a brute-force search of possible inputs to see if they produce a match.

Embodiments of the present disclosure may further secure access to the tree by randomizing the position of each data entry of the set of data entries in the leaf nodes. According to one embodiment, the method further comprises hiding the position of each data entry $\alpha_k$ in the leaf nodes by deriving the position of the data entry $\alpha_k$ as function of the data entry $\alpha_k$ and a random value $\rho$. This may enable to hide the positions of the data entries in the tree.

After defining the hash values of the leaf nodes of the tree, the remaining nodes of the tree which are parent nodes may be determined using the accumulator scheme. For each parent node $u_h^{r_h}$ of the tree, where $2 \leq h \leq d$, a bilinear accumulator a $r_h$ h may be computed from l hash values of respective l children of the parent node $u_h^{r_h}$. In addition, a hash value $\eta_h^{r_h}$ of the bilinear accumulator $a_h^{r_h}$ may be computed as well, $\eta_h^{r_h} = H(a_h^{r_h})$. The resulting tree may be referred to as hash tree. The resulting root node $u_d^1$ may be published e.g., by storing the root node in a publicly accessible database. The root node may provide a representation of the set of data entries. In particular, by using the properties of the accumulator scheme, the root node may advantageously be used to check the set of data entries e.g., by checking whether an entry is stored or not. The set of data entries may be stored in association with the root node. Alternatively, the whole tree may be published in association with the stored data entries. The root node may, for example, be stored in a database which is remotely connected to the computer system. The database may be a third-party database. In one example, the root node may be stored in a blockchain e.g., the root node may be stored in a header of a block of the blockchain while the set of data entries may be stored in the block. After storing the root node, the intermediary may, for example, download the root node to determine, without a need of the secret key, whether the set of data entries are still represented by the same root node. This may be advantageous as the intermediary may not have access to the secret key.

Embodiments of the present disclosure may further improve the tree generation and verification processes by using polynomials and making use of their properties such as the property based on the polynomial remainder theorem. According to one embodiment, the bilinear accumulator may be computed by defining a set of at least J public keys $\{g^{\zeta^j}: 0 \leq j \leq J-1\}$ from a secret key $\zeta$. The secret key $\zeta$ may be referred to as a trapdoor and once the public key is generated secret key $\zeta$ may be destroyed. The secret key $\zeta$ may, for example, be a random number in the finite field $\mathbb{F}_q$. The secret key $\zeta$ may not be made public to secure the accumulator scheme. The number J of public keys may be at least l+1 public keys, $J \geq l+1$, where l is the ary of the tree. An evaluation of a polynomial p on the secret key $\zeta$ may be determined using the l+1 public keys. The polynomial p may be of degree lower than or equal to J−1. The polynomial p has coefficients which are function of at least the l hash values. For example, in case J=l+1, the polynomial is of degree l and its l+1 coefficients are function of the l hash values. Alternatively, the number of public keys may be set to J=l+2 so that the polynomial p may be of degree l+1. The additional degree may be introduced using a random value $\rho'$ so that: $p(X) = (X+\rho') \Sigma_{i=1}^l (X+\eta^i)$. Thanks to this randomness $\rho'$ and bilinear accumulators, the ary and the content of the data entries of the tree may not be leaked. This may ensure that only an upper bound of the number of leaves is known to the users. The bilinear accumulator may be provided as a commitment to the above determined polynomial p evaluated at the secret key $\zeta$. Specifically, the bilinear accumulator $a_h^{r_h}$ of a parent node $u_h^{r_h}$ may be computed from the hash values of the l children e.g., $u_{h-1}^1$, $u_{h-1}^2, \ldots, u_{h-1}^l$ as follows: $a_h^{r_h}=g^{p(\zeta)}$, where $p(X)=(X+\rho')\Sigma_{i=1}^l(X+\eta_{h-1}^i)$ where $\eta_{h-1}^i$ is the hash value of the children, $\rho'$ is a random value, $\zeta$ is the secret key and X is a variable used for definition purpose. Alternatively, $p(X)=\Sigma_{i=1}^l(X+\eta_{h-1}^i)$, meaning that the random value $\rho'$ is not used.

Once determined, the tree and its bilinear accumulators may efficiently be used to prove the membership of a data entry of the set of data entries $\{\alpha_1, \alpha_2, \ldots, \alpha_n\}$. Proving the membership of a data entry meaning determining whether the data entry has been stored. According to one embodiment, the method further comprises: proving a membership of a data entry of the set of data entries in the tree by: determining an authentication path between the leaf node associated with the data entry and the root node. The authentication path may, for example, comprise between the leaf node and the root node any set of d−1 nodes having distinct heights. In one example, the authentication path may comprise between the leaf node and the root node a user defined set of d−1 nodes having distinct heights. The authentication path is determined by the bilinear accumulators in the tree and the leaf node. Starting from the leaf node, a witness may be computed that shows that the hash of the leaf node has been incorporated into the bilinear accumulator of its parent node. And, for each non-leaf node of the path which is not the root node, a witness may be computed and/or provided. The witness of the non-leaf node is a witness that the hash value of said non-leaf node was incorporated into the bilinear accumulator computed for its parent node. The witnesses may be provided according to the accumulator scheme.

According to one example, the witness of a node may be determined according to the polynomial remainder theorem. For that, a quotient polynomial q(X) may be determined from the determined polynomial p(X). The witness may be computed or provided as a commitment to the quotient polynomial. For example, the witness $w_{h+1}^{r_{h+1}}$ of a node $u_h^{r_h}$ may be defined as $w_{h+1}^{r_{h+1}}=g^{q(\zeta)}$, where $q(\zeta)=(\zeta+\rho')\Sigma_{i=1,i\neq r_h}^l(\zeta+\eta_h^i)$, $\eta_h^i$ is the hash value of the children of the parent node $u_{h+1}^{r_{h+1}}$ of that node $u_h^r$.

Embodiments of the present disclosure may further be advantageous as it may enable users to query information related to the tree. This may particularly be advantageous if the users are the owner of the set of data entries. Thus, according to one example, the method further comprises before creating the tree, receiving by the computer system the set of data entries $\{\alpha_1, \alpha_2, \ldots, \alpha_n\}$ from one or more users. The computer system may provide the root node to the one or more users. The computer system may receive a verification request from one of the users. The verification request comprises the provided root node. The user may, for example, want to check if his/her data entries are indeed still stored as originally provided. The computer system may download the stored root node and compare the hash value of the downloaded root node with the hash value of received root node. As a response to the verification request, the computer system may provide a result of the comparison to the user. If the verification is not successful, this may indicate that one or more data entries have been modified. These one or more modified entries may or may not be part of the entries of the user who requested the verification. This is because the user has only sent the root node without specifying the data entries to be checked. However, this example may still be advantageous. In particular, even if the one or more modified entries may not belong to the requesting user, it may be safer for the user to not trust the stored data anymore as his/her own other entry may be affected as well.

Embodiments of the present disclosure may further improve access to the tree by enabling users to verify specific entries of the set of data entries. According to one example, the computer system may receive a request from a user to prove that a data entry $\alpha_k$ of the set of data entries has been included in the tree. The computer system may determine or identify an authentication path from the node having the data entry $\alpha_k$ to the root node of the tree. The authentication path comprises, between the leaf node and the root node, a selected set of d−1 nodes, wherein each node has a distinct height in the tree. The authentication path may comprise d non-leaf nodes because the maximum height of the tree is d. The computer system may provide the root node $u_d^1$ and the bilinear accumulators $a_1^{r_1}, a_2^{r_2} \ldots a_d^1$ corresponding to the non-leaf nodes in the authentication path to the user. This example may enable the users to verify by themselves using the accumulator scheme the existence of the data entry based on the provided root node and the bilinear accumulators.

Embodiments of the present disclosure may further secure the access to the tree by providing a privacy-preserving accumulator-based proof of inclusion. For that, the computer system may provide public keys in association with the secret key $\zeta$. In particular, the computer system may provide an upper limit L of the ary l of the tree as the number of public keys. The set of public keys may be created such that each key of the set of public keys is the generator g with an exponent being a polynomial on the secret key $\zeta$ as follows: $\{g^{\zeta^j}: 0 \leq j \leq L\}$.

For each entry $\alpha_{r_0}$ of the set of data entries, the computer system may provide a proof $\Pi_{r_0}$. For that, the computer system may determine an authentication path from the node $u_0^{r_0}$ having the data entry $\alpha_{r_0}$ to the root node $u_d^1$. The authentication path comprises in addition to the root node d−1 non-leaf nodes $u_1^{r_1}, u_2^{r_2} \ldots u_{d-1}^{r_{d-1}}$. For each node in $\{u_0^{r_0}, u_1^{r_1}, u_2^{r_2} \ldots u_{d-1}^{r_{d-1}}\}$ (i.e., for each node in the authentication path excluding the root node), the computer system may compute a witness that the hash value of the node was included into the bilinear accumulator of the parent node of said node. This may result in d witnesses $w_1^{r_1}, w_2^{r_2} \ldots w_d^1$. The witness may be computed for each node $u_h^{r_h}$, where $0 \leq h \leq d-1$, of the d nodes as follows. The node $u_h^{r_h}$ may be a child of a parent node $u_{h+1}^{r_{h+1}}$ which is also parent for other l−1 children. The witness $w_{h+1}^{r_{h+1}}$ for node $u_h^{r_h}$ may be computed as an accumulator of said l−1 other children as follows: $w_{h+1}^{r_{h+1}}=g^{q(\zeta)}$, where $q(X)=(X+\rho')\Sigma_{i=1,i\neq r_h}^l(X+\eta_h^i)$, $\eta_h^i$ is the hash value of the children of the parent node of that node $u_h^{r_h}$ and $\rho'$ is the random value. However, in case $p(\zeta)=\Sigma_{i=1}^l(X+\eta_h^i)$, q(X) may be provided as follows: $q(X)=\Sigma_{i=1,i\neq r_h}^l(X+\eta_h^i)$. The witness can be derived as follows: $w_{h+1}^{r_{h+1}}=\Pi_{i=0}^l g^{q_i\zeta^i}$ where $q(X)=\Sigma_{i=0}^l q_iX^i$. The computer system may provide the proof $\Pi_{r_0}$ comprising the following d pairs: $\Pi_{r_0}=(<w_1^{r_1}, a_1^{r_1}>, <w_2^{r_2}, a_2^{r_2}> \ldots <w_d^1, a_d^1>)$. The computer system may provide the proof to the user. The user may use the proof as follows to perform verification. The user may determine whether the accumulator $a_d^1$ of the root node is equal to the accumulator $a_d^1$ in the proof $\Pi_{r_0}$. In response to determining that the two accumulators are equal, the user may check if $e(w_1^{r_1}, g^\zeta g^{H(\alpha r_0)})=e(\alpha_1^{r_1}, g)$ and $e(w_h^{r_h}, g^\zeta g^{H(\alpha_{h-1}^{r_{h-1}})})=e(a_h^{r_h}, g)$ for $2 \leq h \leq d$, where $H(\cdot)$ is the hash function, where $g^\zeta$ and g are part of the set of public keys and $r_d=1$. This check can be done without knowledge of the secret key $\zeta$. In response to determining that the check is successful, the user may determine that the data entry $\alpha_{r_0}$ is indeed stored.

FIG. 1 depicts a tree 100 in accordance with $\alpha_n$ example embodiment of the present disclosure. The tree may be an l-ary tree. The tree 100 may be a complete tree, so that each parent node in the tree has l children. The tree may comprise a number $N_h$ of nodes at height h of the tree.

The tree 100 comprises $n=N_0$ leaf nodes referred to as $u_0^1, \ldots, u_0^n$, respectively, where the lower index zero indicates the height 0 (h=0) of said leaf nodes in the tree 100. Each leaf node of the leaf nodes $u_0^1, \ldots, u_0^n$ may comprise a hash value $\eta_0^1, \ldots, \eta_0^n$ of a respective data entry of a set n data entries $\alpha_1, \alpha_2, \ldots, \alpha_n$. For example, $\eta_0^1=H(\alpha_1)$, $\eta_0^2=H(\alpha_2) \ldots \eta_0^n=H(\alpha_n)$, where $H(\cdot)$ is a hash function. The hash function may, for example, be defined as cryptographic hash function: $H: \{0,1\}^* \rightarrow \mathbb{F}_q$.

The root node $u_d^1$ at height h=d of the tree 100 is shown as having exactly l children $u_{d-1}^1, \ldots, u_{d-1}^l$ at height h=d−1. That is, l is the total number $N_{d-1}$ of nodes ($l=N_{d-1}$) at the height h=d−1. The root node u 1 d may have a bilinear accumulator $a_d^1$ which is computed from the hash values of the l children $u_{d-1}^1, \ldots, u_{d-1}^l$. This is indicated in FIG. 1 by the function $Acc(\cdot)$ as follows: $a_d^1=Acc(\eta_{d-1}^1, \ldots, \eta_{d-1}^l)$. The root node $u_d^1$ may have a hash value $\eta_d^1$ which may be obtained from the bilinear accumulator $a_d^1$ as follows $\eta_d^1=H(a_d^1)$.

As with the root node $u_d^1$, each further node of the tree which is not a leaf node has exactly l children. For example, the tree 100 may comprise at height h=1 a number $N_1$ of nodes such that each node at the height h=1 of the tree 100 is a parent node of respective set of l leaf nodes. For example, the node $u_1^1$ is the parent node of the l leaf nodes: $u_0^1, \ldots, u_0^l$, the node $u_1^2$ is the parent node of the l leaf nodes: $u_0^{l+1}, \ldots, u_0^{2l}$, the node $u_1^3$ is the parent node of the l leaf nodes: $u_0^{2l+1}, \ldots, u_0^{3l}$, the node $u_1^4$ is the parent node of the l leaf nodes: $u_0^{3l+1}, \ldots, u_0^{4l}$ and so on. As with the leaf nodes, each parent node at the height h=1 may have a respective hash value $\eta_1^1, \ldots, \eta_1^{N_1}$, which is obtained by first computing a bilinear accumulator $a_1^1, \ldots, a_1^{N_1}$ using the hash values $\eta_0^1, \ldots, \eta_0^{N_0}$ of the leaf nodes. For example, the bilinear accumulator $a_1^1$ of the node $u_1^1$ may be obtained from the first l hash values $\eta_0^1, \ldots, \eta_0^l$ of its respective children $u_0^1, \ldots, u_0^l$ as follows: $a_1^1=g^{p(\zeta)}$, where $p(X)=(X+\rho')\Sigma_{i=1}^l(X+\eta_0^i)$ or $p(X)=\Sigma_{i=1}^l(X+\eta_0^i)$. The bilinear accumulator $a_1^2$ of the node $u_1^2$ may be obtained from the subsequent l hash values $\eta_0^{l+1}, \ldots, \eta_0^{2l}$ of its respective children $u_0^{l+1}, \ldots, u_0^{2l}$ as follows: $a_1^2=g^{p(\zeta)}$, where $p(X)=(X+\rho')\Sigma_{i=l+1}^{2l}(X+\eta_0^i)$ or $p(X)=\Sigma_{i=l+1}^{2l}(X+\eta_0^i)$. Similarly, the bilinear accumulators of the remaining nodes at h=1 and other heights may be obtained from the hash values of their respective set of children.

Figure 2:
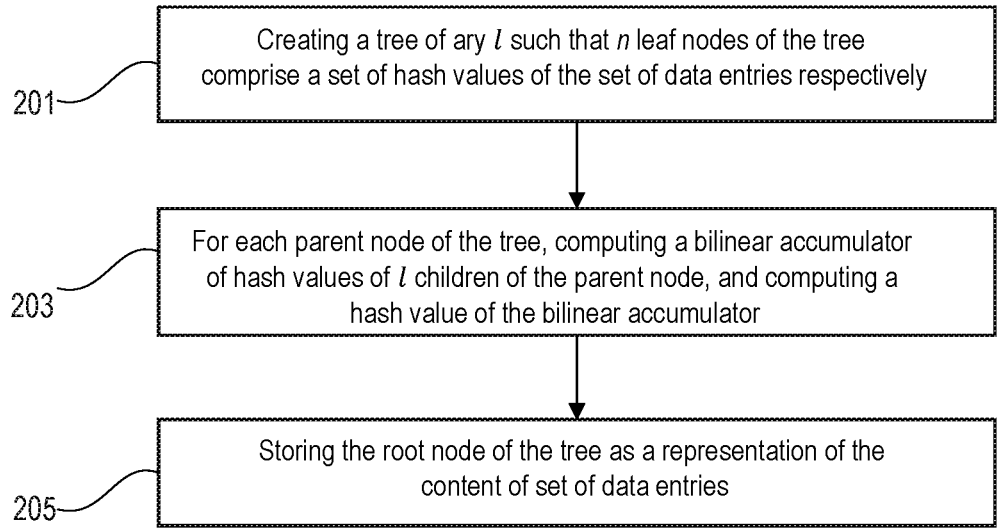
FIG. 2 is a flowchart of a method for storing a set of data entries in accordance with an example embodiment of the present disclosure.

FIG. 2 is a flowchart of a method for storing a set of data entries in accordance with an example embodiment of the present disclosure.

A tree of ary l may be created in step 201 by creating a number n of leaf nodes of the tree which is equal to the number of data entries. The leaf nodes may have hash values of the set of data entries respectively. After that, the other nodes of the tree may be created, for example, sequentially following the height of the tree, but it is not limited to this sequential processing as the skilled person in the art may use other techniques to determine the nodes. Each parent node of the tree may be created in step 203 and associated hash value may be computed by first computing a bilinear accumulator of hash values of l children of the parent node and second computing the hash value from the bilinear accumulator. The resulting tree may, for example, be the tree shown in FIG. 1. The root node of the tree may be stored in step 205 as a representation of the content of set of data entries.

Figure 3:
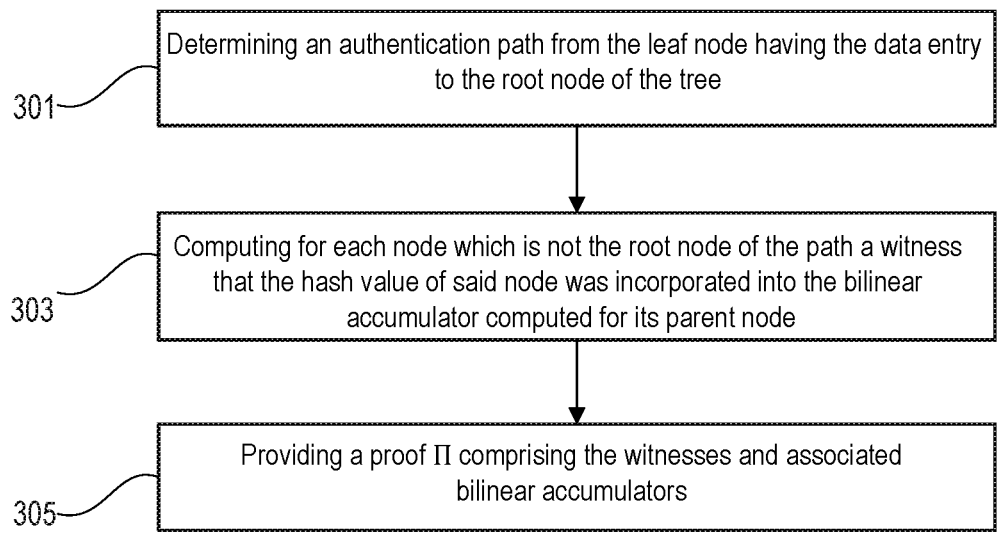
FIG. 3 is a flowchart of a method for computing a proof for a given data entry in a tree of hash values in accordance with an example embodiment of the present disclosure.

FIG. 3 is a flowchart of a method for computing a proof for a given data entry $\alpha_k$ in a tree such as the tree of FIG. 1 in accordance with an example embodiment of the present disclosure.

An authentication path from the leaf node $u_0^{r_0}$ having the data entry $\alpha_k$ to the root node $u_d^1$ of the tree 100 may be determined in step 301. The authentication path comprises, in addition to the root node, a set of d nodes, $u_0^{r_0}, u_1^{r_1}, u_2^{r_2}, \ldots u_{d-1}^{r_{d-1}}$. For each node $u_h^{r_h}$ of the set of nodes at a given height h: a witness $w_{h+1}^{r_{h+1}}$ may be computed in step 303. The witness $w_{h+1}^{r_{h+1}}$ is associated with the parent node $u_{h+1}^{r_{h+1}}$ such that the witness $w_{h+1}^{r_{h+1}}$ may be used to witness that the hash value $\eta_h^{r_h}$ of the child node $u_h^{r_h}$ has been accumulated in the accumulator of said parent node $u_{h+1}^{r_{h+1}}$ of that node $u_h^{r_h}$, wherein $w_{h+1}^{r_{h+1}}=g^{q(\zeta)}$, where $q(X)=(X+\rho')\Sigma_{i=1,i\neq r_h}^l(X+\eta_h^i)$. A proof $\Pi$, the root node, an instance of the bilinear accumulator and the public keys may be provided in step 305 for enabling a verification of the existence of said data entry $\alpha_k$ using the provided data. The proof $\Pi$ comprises d pairs of the witnesses and associated bilinear accumulators ($<w_1^{r_1}, a_1^{r_1}>, <w_2^{r_2}, a_2^{r_2}> \ldots <w_d^1, a_d^1>$).

Figure 4:
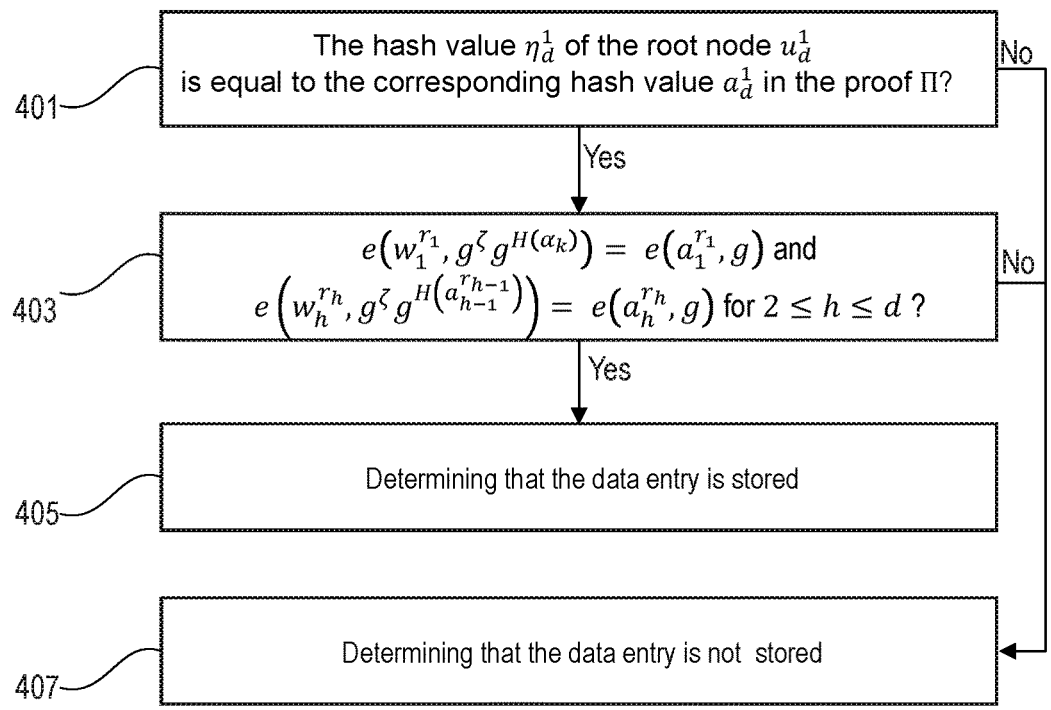
FIG. 4 is a flowchart of a method for using the provided proof to check a data entry in accordance with an example embodiment of the present disclosure.

FIG. 4 is a flowchart of a method for using the provided proof in FIG. 3 to check the data entry $\alpha_k$ in accordance with $\alpha_n$ example embodiment of the present disclosure.

It may be determined in step 401 whether the hash value $\eta_d^1$ of the root node $u_d^1$ is equal to the hash value of $a_d^1$ in the proof $\Pi$. If the two hash values are not equal it may be determined in step 407 that the data entry is not stored as originally provided. In response to determining that the two hash values are equal, it may be checked in step 403 whether $e(w_1^{r_1}, g^\zeta g^{H(\alpha_k)})=e(a_1^{r_1}, g)$ and $e(w_h^{r_h}, g^\zeta g^{H(a_{h-1}^{r_{h-1}})})=e(a_h^{r_h}, g)$ for $2 \leq h \leq d$, where $H(\alpha_k)$ is hash value of the data entry $\alpha_k$. In response to determining that the check is successful, it may be determined in step 405 that the data entry is stored, otherwise, it may be determined in step 407 that the data entry is not stored as originally provided.

Figure 5:
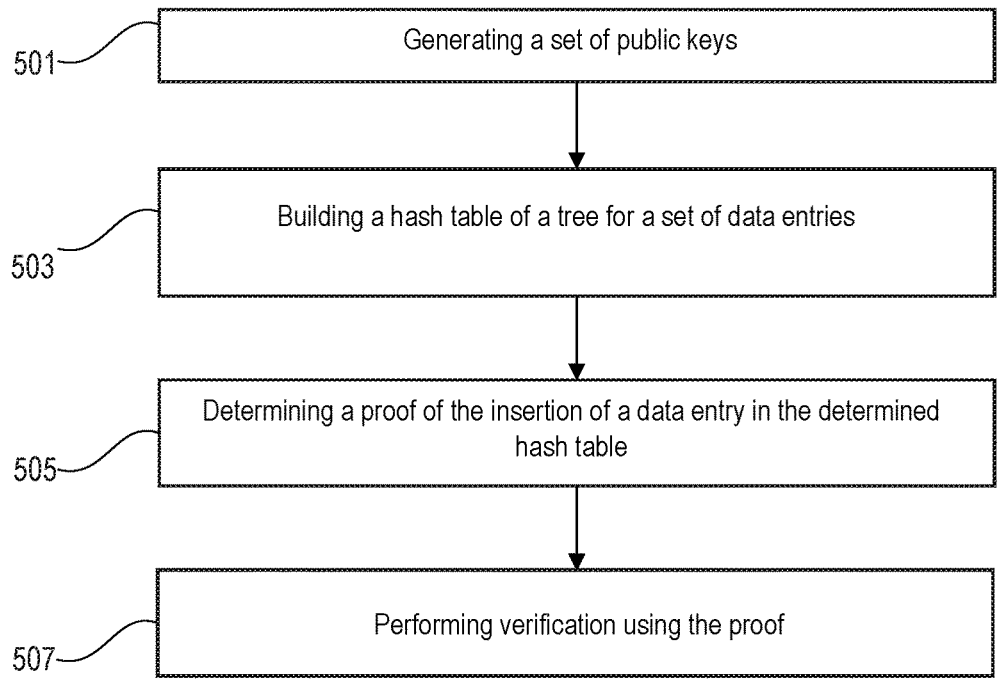
FIG. 5 is a flowchart of a verification method in accordance with an example embodiment of the present disclosure.

FIG. 5 is a flowchart of a verification method in accordance with an example embodiment of the present disclosure.

The present method may enable a privacy-preserving accumulator-based proof of inclusion consisting of the steps 501 to 507. In step 501, a set of public keys may be generated. For that, a function called $SETUP(\cdot)$ may be used. On input of integer L to the function SETUP, the function may select a trapdoor $\zeta \in \mathbb{F}_q$ conclude its execution by outputting $(z_0, z_1, \ldots, z_L)=(g, g^\zeta, \ldots, g^{\zeta^L}) \in \mathbb{G}^{L+1}$. The trapdoor $\zeta$ may be destroyed after the termination of the function SETUP because only the set of public keys (g, $g^\zeta, \ldots, g^{\zeta^L}$) may be used for further processing.

A hash table may be built in step 503 for a set of data entries $A=\{\alpha_1, \alpha_2, \ldots, \alpha_n\}$ using a function called $COMMIT(\cdot)$. On input of the set A, integer l and two random values $\rho$ and $\rho'$ in $\mathbb{F}_q$, COMMIT builds the hash table for elements in the set A. To hide the positions of the elements in the hash table, COMMIT derives the position of element $\alpha_i$ as a function of $\alpha_i$ and random value $\rho$. COMMIT then builds a hash tree $\mathcal{T}$ of ary l for the set A such that each parent node is computed as the bilinear accumulator of its children and random value $\rho'$. That is, the parent node of children $(a_1, \ldots, a_l) \in \mathbb{G}^l$ is defined as $g^{p(\zeta)}$, where $p(X)=(X+\rho')\Sigma_{i=1}^l(X+\eta^i)$ and $\eta^i=H(\alpha_i)$. Without loss of generality, it may be assumed that $n=l^d$. This means that tree $\mathcal{T}$ is a l-ary tree of height d.

A proof of the insertion of data entry $\alpha$ in the determined Merkle tree $\mathcal{T}$ may be determined in step 505. For that, a function PROVE(·) may be used. On input of the data entry $\alpha$, Merkle tree $\mathcal{T}$ and two random values $\rho$ and $\rho'$, the function PROVE finds $\alpha$ in the Merkle tree $\mathcal{T}$ using the random value $\rho$. The function PROVE then uses random value $\rho'$ and the values in the authentication path of the data entry $\alpha$ to the root of tree $\mathcal{T}$ to compute proof $\Pi$. The proof $\Pi$ may consist of d pairs $(w_1, a_1), \ldots (w_d, a_d)$ such that $e(w_1, z_1 z_0^{H(\alpha)}) = e(\alpha_1, z_0)$ and $e(w_i, z_1 z_0^{H(a_{i-1})}) = e(a_i, z_0)$ for $2 \le i \le d$.

The proof $\Pi$ may be used e.g., by a user to verify in step 507 if the data entry $\alpha$ is indeed included in the tree $\mathcal{T}$. For that a function called VERIFY(·) may be used. On input of the data entry $\alpha$, the proof $\Pi$ and root $\sigma$ of the tree $\mathcal{T}$, VERIFY checks if $\sigma = a_d$. If not, VERIFY outputs "FALSE". Else, VERIFY checks if $e(w_1, z_1 z_0^{H(\alpha)}) = e(a_1, z_0)$ and $e(w_i, z_1 z_0^{H(a_{i-1})}) = e(a_i, z_0)$ for $2 \le i \le d$. If the checks are successful, then VERIFY outputs TRUE. Note that thanks to randomness $\rho'$ and bilinear accumulators, the ary of the tree is not leaked. This ensures that only an upper bound of the number of leaves is known to the users.

An example application of embodiments of the present disclosure may be a three-party system involving a user, an intermediary and a central database system. The database may, for example, be a blockchain e.g., for central-bank digital currency (CBDC). However, concerns about the scalability of blockchain-based designs may arise. One approach to scale blockchain-based design may be off-chain processing and storage of the data entries before providing information to the blockchain. Instead of recording every single data entry on chain, intermediaries may be tasked with managing the data entries e.g., originating from accounts and transactions of retail users. Data entries may be recorded by the respective intermediaries. The latter periodically submit the stored data entries on chain to reconcile their records. For accountability purposes, it is desirable for intermediaries to leave a short commitment of the data entries resulting from off-chain transactions in the shared ledger in such a way that retail users can verify that their transactions were accounted for and that the balance information recorded internally by the intermediaries matches the public information recorded in the shared ledger. Notably, the intermediary publishes the root node of the tree created from the set of data entries representing off-chain transactions. Once the tree root is published, users can request proofs of inclusion from the intermediary of their transactions (account balances resp.). The present solution may be advantageous as it may not leak information about the number of off-chain transactions and the number of accounts an intermediary handle. In particular, the present method may allow users to verify the inclusion of their transactions and balance information in the commitments stored in the ledger while ensuring that sensitive business and personal information is not leaked to external parties. The solution combines hash trees and bilinear accumulators to allow for efficient and privacy-preserving inclusion proofs.

In one example implementation, time is divided into epochs, and each intermediary submits a reconcile transaction at the end of each epoch. The reconcile transaction may be data. The reconcile transaction may comprise a root node of the tree of the data entries representing the transactions. The reconcile updates the state of the intermediary according to the data entries (representing off-chain transactions) they have received during the epoch. The state of an intermediary is defined by a pair $(hist_e, bal_e)$ such that $hist_e$ is a commitment to all off-chain transactions that took place in one epoch and $bal_e$ is a commitment to the balance information of users at the end of the one epoch. The commitment may be the root node of the tree created for the data entries.

Once reconcile transactions are committed, users can request from the intermediary proofs of inclusion of a data entry representing a transaction (resp. a balance) to check if a transaction (their balance resp.) is included in $hist_e$ ($bal_e$ resp.). At the end of each epoch, $\alpha_n$ intermediary submits a reconcile transaction that publishes pair $(hist_e, bal_e)$. $hist_e$ is computed by calling COMMIT on the set of data entries representing all the off-chain transactions that took place during the epoch. $bal_e$ is obtained by invoking COMMIT on the set of data entries representing account balances of users at the end of epoch. During the epoch, each user keeps track of data entries representing their off-chain transactions and account balance. To discard this information after the epoch elapses, users request proofs of inclusion of data entries representing their transactions and balance in $hist_e$ and $bal_e$ respectively. More specifically, users and intermediaries proceed as follows: a user requests a proof of inclusion of data entry representing a transaction tx (balance information B resp.) from the intermediary; the intermediary checks if the user is authorized to request a proof of inclusion for tx (B resp.); if not, the intermediary rejects, else, it calls PROVE on tx (B resp.) and returns the resulting proof $\Pi_{tx}$ ($\Pi_B$ resp.); the user calls VERIFY on input (tx, $hist_e$, $\Pi_{tx}$) ((B, $bal_e$, $\Pi_B$) resp.) and outputs the result. VERIFY may output true or false.

Computing environment 800 contains an example of an environment for the execution of at least some of the computer code involved in performing the inventive methods, such as bilinear accumulation-based tree generation code 900. In addition to block 900, computing environment 800 includes, for example, computer 801, wide area network (WAN) 802, end user device (EUD) 803, remote server 804, public cloud 805, and private cloud 806. In this example, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 6:
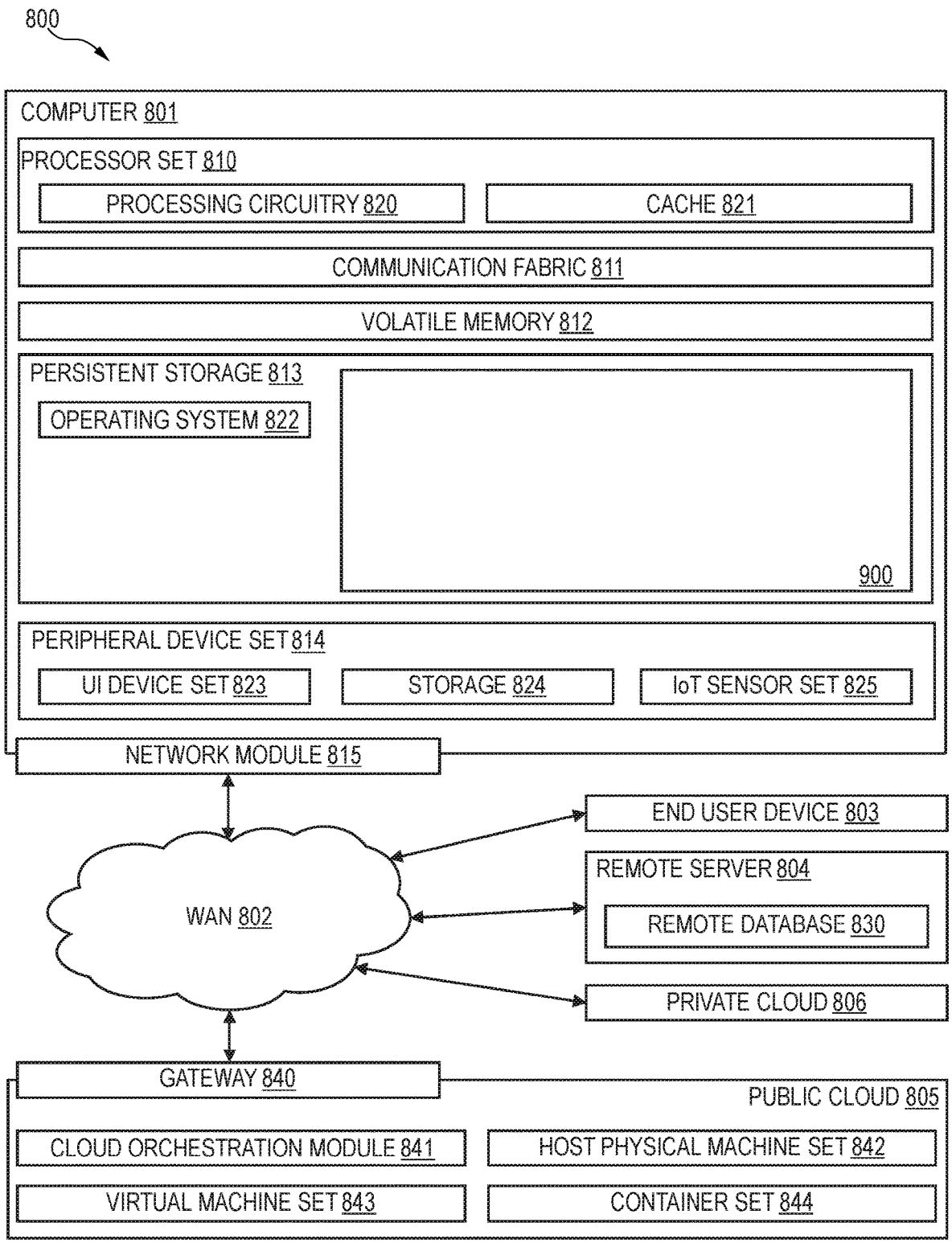
FIG. 6 is a computing environment in accordance with an example embodiment of the present disclosure.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 6. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A method for storing a set of n data entries $\{\alpha_1, \alpha_2, \ldots, \alpha_n\}$, the method comprising:

creating a tree of ary l such that n leaf nodes of the tree comprise a set of hash values of the set of data entries respectively;

for each parent node of the tree, computing a bilinear accumulator of hash values of l children of the parent node, and computing a hash value of the bilinear accumulator, wherein computing the bilinear accumulator comprises:

defining a set of at least l+1 public keys $\{g^{\zeta^{ds\ j}}:0\leq j\leq l\}$ from a secret key $\zeta$, g being a generator of a cyclic group of the bilinear accumulator, and evaluating a polynomial p(X) of degree higher than or equal to l at the secret key $\zeta$, the polynomial having coefficients which are function of at least the l hash values, wherein the bilinear accumulator is a commitment to a polynomial p($\zeta$);

publishing a root node of the tree as a representation of the set of data entries;

receiving a request for proof of inclusion of a data entry a, the request including the root node;

generating a proof based on the root node and a leaf node associated with the data entry; and in response to the request, providing the proof.

2. The method of claim 1, wherein generating the proof comprises:

determining an authentication path between the leaf node associated with the data entry and the root node; and providing, for each non-root node, a witness that the hash value of the non-root node was incorporated into the bilinear accumulator computed for the parent node of the non-root node.

3. The method of claim 2, wherein determining the witness of each node comprises:

determining according to the polynomial remainder theorem a quotient polynomial from the evaluated polynomial; and providing the witness as a commitment to the quotient polynomial.

4. The method of claim 3, further comprising verifying whether the data entry $\alpha$ is included in the tree, the verifying comprising: determining whether $e(w_1^{r_1}, g^\zeta g^{H(\alpha_k)})=e(a_1^{r_1}, g)$ and $e(w_h^{r_h}, g^\zeta g^{H(a_{h-1}^{r_{h-1}})})=e(a_h^{r_h}, g)$ for $2\leq h\leq d$, d being a height of the tree, e is a pairing, $w_h^{r_h}$ is the witness, and $a_h^{r_h}$ is the bilinear accumulator, where $H(\alpha)$ is hash value of the data entry $\alpha$, and in response to determining that the check is successful determining that the data entry is included.

5. The method of claim 1, further comprising: determining the polynomial of degree l+1 using a random value $\rho'$ as follows: $p(X)=(X+\rho')\Sigma_{i=1}^{l}(X+\eta^i)$, where $\eta^i$ is the hash value of the children, where the bilinear accumulator is defined as follows: $g^{p(\zeta)}$.

6. The method of claim 5, further comprising: for each data entry of at least part of the set of data entries:

determining an authentication path between the leaf node associated with the data entry and the root node;

providing for each non-leaf node $u_h^r$ at height $0\leq h\leq d-1$ of the path a witness that the hash value of said non-leaf node was incorporated into the bilinear accumulator computed for the parent node of said non-leaf node at height h+1, the witness being defined as $w_h=g^{q(\zeta)}$, where $q(X)=(X+\rho')\Sigma_{i=1,i\neq r}^{l}(X+\eta_h^i)$, $\eta_h^i$ is the hash value of the children of that parent node of that node $u_h^r$; and publishing the witnesses, associated bilinear accumulators and the set of public keys.

7. The method of claim 1, further comprising:

before creating the tree, receiving the set of data entries from one or more users;

storing locally the tree;

receiving a verification request from the user, the verification request comprising the published root node;

comparing the hash value of the root node of the locally stored tree with the hash value of received root node; and providing a result of the comparing to the user.

8. The method of claim 1, wherein the root node is stored in a database of a third-party service.

9. The method of claim 1, wherein the root node is stored in a block of a blockchain of a third-party service.

10. The method of claim 1, further comprising hiding the position of the data entry in the leaf nodes by deriving a position of the data entry as function of the data entry and a random value $\rho$.

11. The method of claim 1, wherein a number of data entries n is a multiple of the ary l such that n % l=0, and n=$l^d$, where d is a maximum height of the tree.

12. A computer system for storing a set of n data entries $\{\alpha_1, \alpha_2, \ldots, \alpha_n\}$, the computer system comprising one or more computer readable storage media and one or more processors, the one or more processors configured to execute program instructions stored on the one or more computer readable storage media to perform operations comprising:

creating a tree of ary l such that n leaf nodes of the tree comprise a set of hash values of the set of data entries respectively;

for each parent node of the tree, computing a bilinear accumulator of hash values of l children of the parent node, and computing a hash value of the bilinear accumulator, wherein the bilinear accumulator of the l children is defined as follows: $g^{p(\zeta)}$, where $p(X)=(X+\rho')\Sigma_{i=1}^{l}(X+\eta_i)$ where $\eta_i$ is the value of the children, $\rho'$ is a random value, $\zeta$ is a secret key, and g is a generator of a group of the bilinear accumulator;

publishing a root node of the tree as a representation of the set of data entries;

receiving a request for proof of inclusion of a data entry $\alpha$, the request including the root node;

generating a proof based on the root node and a leaf node associated with the data entry; and in response to the request, providing the proof.

13. The system of claim 12, wherein publishing the root node comprises storing the root node in a database remotely connected to the computer system.

14. The system of claim 12, wherein publishing the root node comprises storing the root node in a blockchain of a third-party service.

15. The system of claim 12, wherein the operations further comprise hiding the position of the data entry in the leaf nodes by deriving a position of the data entry as function of the data entry and a random value $\rho$.

16. A computer program product for storing a set of n data entries $\{\alpha_1, \alpha_2, \ldots, \alpha_n\}$, the computer program product comprising a computer readable storage medium having program instructions embodied therewith, the program instructions executable by one or more processors to cause the one or more processors to perform operations comprising:

creating a tree of ary l such that n leaf nodes of the tree comprise a set of hash values of the set of data entries respectively;

for each parent node of the tree, computing a bilinear accumulator of hash values of l children of the parent node, and computing a hash value of the bilinear accumulator, wherein the bilinear accumulator of the l children is defined as follows: $g^{p(\zeta)}$, where $p(X)=(X+\rho')\Sigma_{i=1}^{l}(X+\eta_i)$ where $\eta_i$ is the hash value of the children, $\rho'$ is a random value, $\zeta$ is a secret key, and g is a generator of a group of the bilinear accumulator;

publishing a root node of the tree as a representation of the set of data entries;

receiving a request for proof of inclusion of a data entry α, the request including the root node;

generating a proof based on the root node and a leaf node associated with the data entry; and in response to the request, providing the proof.

17. The computer program product of claim 16, wherein the operations further comprise hiding the position of the data entry in the leaf nodes by deriving a position of the data entry as function of the data entry and a random value ρ.

* * * * *